(12) United States Patent
Chang

(10) Patent No.: US 10,836,282 B2
(45) Date of Patent: Nov. 17, 2020

(54) RECLINING DEVICE FOR VEHICLE SEAT

(71) Applicant: HYUNDAI TRANSYS INCORPORATED, Seosan-si (KR)

(72) Inventor: Seung Hun Chang, Hwaseong-si (KR)

(73) Assignee: HYUNDAI TRANSYS INCORPORATED, Seosan-si (KR)

( * ) Notice: Subject to any disclaimer, the term of this patent is extended or adjusted under 35 U.S.C. 154(b) by 0 days.

(21) Appl. No.: 16/677,997

(22) Filed: Nov. 8, 2019

(65) Prior Publication Data

US 2020/0164774 A1 May 28, 2020

(30) Foreign Application Priority Data

Nov. 28, 2018 (KR) ........................ 10-2018-0149968

(51) Int. Cl.
 *B60N 2/22* (2006.01)
(52) U.S. Cl.
 CPC .................................. *B60N 2/2227* (2013.01)
(58) Field of Classification Search
 CPC ..................................................... B60N 2/2227
 USPC ......................................................... 297/373
 See application file for complete search history.

(56) References Cited

U.S. PATENT DOCUMENTS

| 3,823,440 A * | 7/1974 | Klingelhofer ........ B60N 2/2252 297/373 |
| 2015/0246625 A1* | 9/2015 | Leconte ............... B60N 2/2227 297/361.1 |

FOREIGN PATENT DOCUMENTS

| DE | 102005031968 A1 * | 8/2006 | ........... B60N 2/2227 |
| JP | 2003-289973 A | 10/2003 | |
| KR | 10-0785624 B1 | 12/2007 | |
| KR | 10-1799760 B1 | 11/2017 | |

\* cited by examiner

*Primary Examiner* — Anthony D Barfield
(74) *Attorney, Agent, or Firm* — Novick, Kim & Lee, PLLC; Jae Youn Kim; Jihun Kim

(57) ABSTRACT

Disclosed is a reclining device for a vehicle seat, the reclining device includes: a flange having inner teeth; a gear plate having an outer tooth part and a coupling part, the outer tooth part provided with outer teeth and engaged with a part of the inner teeth of the flange in an eccentric state with the flange, and the coupling part having a locking step; an input device provided inside a through hole of the gear plate and coupled to a shaft to allow the flange and the gear plate to be eccentric with each other and to perform relative rotation when the shaft is rotated; and a bracket having an insertion hole, and a locking protrusion that is locked by the locking step of the coupling part formed at an inner circumferential surface of the insertion hole to prevent the relative rotation with the gear plate.

7 Claims, 7 Drawing Sheets

PRIR ART

RECLINING DEVICE FOR VEHICLE SEAT

CROSS REFERENCE TO RELATED APPLICATION

The present application claims priority to Korean Patent Application No. 10-2018-0149968, filed Nov. 28, 2018, the entire contents of which is incorporated herein for all purposes by this reference.

BACKGROUND OF THE INVENTION

Field of the Invention

The present invention relates generally to a reclining device for a vehicle seat and, more particularly, to a reclining device for a vehicle seat, which is capable of angle adjustment in front and rear directions of a seatback with respect to a seat cushion.

Description of the Related Art

Generally, a seat provided in a vehicle includes a seatback supporting the upper body of a passenger, a seat cushion supporting the lower body such as the buttocks and the thigh of a passenger, and a headrest supporting the back of the head. On a portion where the seatback and the seat cushion are connected, a reclining device that enables the angle adjustment in the front and rear directions of the seatback with respect to the seat cushion is mounted.

The reclining device is divided into two types. A manual type is configured to adjust angle of the seatback by lever operation by a passenger, and a power type is configured to automatically operate by power of a motor through switch operation.

FIGS. 1 and 2 are an exploded perspective view and an assembled-state top view of a reclining device, respectively, for a vehicle seat according to the related art.

In FIGS. 1 and 2, the reclining device of the related art using a cam structure is shown. The reclining device includes: a flange 1 having an internal gear 1a and a cylindrical-shaped flange protrusion 1b at the center thereof; a gear plate 2 having an external gear 2a engaged with the internal gear 1a and a cylindrical-shaped plate protrusion 2b at the center thereof; an input device 4 having a central protrusion 4a through which a recliner shaft 3 passes and is coupled thereto and a device protrusion 4b integrally formed in an outer side of the central protrusion 4a; a bearing 5 passing through the gear plate 2 and fitted between the outside of the device protrusion 4b and the plate protrusion 2b of the gear plate 2; a first cam 6 and a second cam 7 fitted between the outside of the flange protrusion 1b and the bearing 5; and a spring 8 coupled to the first and second cams 6 and 7 by inserting opposite ends of the spring therein.

In the input device 4, a disk portion 4c is integrally formed therein by protruding outwards from the central protrusion 4a, and the device protrusion 4b is formed to be connected with the disk portion 4c.

The spring 8 is provided in a state of being close contact with a surface of the disk portion 4c, and the opposite ends of the spring 8 pass through the disk portion 4c and then are respectively inserted into ends of the first and second cams 6 and 7, which face each other.

Spring holes 6a and 7a are respectively formed in the ends of the first and second cams 6 and 7, which face each other, so that the opposite ends of the spring 8 are inserted thereinto.

The bearing 5 is provided between the plate protrusion 2b of the gear plate 2 and the flange protrusion 1b. The central protrusion 4a of the input device 4 is provided to pass through the flange protrusion 1b of the flange 1. At this point, the disk portion 4c covers the bearing 5 and the first and second cams 6 and 7.

Further, the reclining device includes a retainer 9 coupling the flange 1 and the gear plate 2 together.

In the state shown in FIG. 2, when the recliner shaft 3 is rotated clockwise, the input device 4 is rotated clockwise therewith. The rotation of the input device 4 causes the device protrusion 4b to be rotated together, so that the first cam 6 is rotated clockwise.

Then, a first end of the spring 8 coupled to the first cam 6 is moved to a second end thereof coupled to the second cam 7, so that a gap between the opposite ends of the spring 8 is narrowed and at the same time the spring 8 accumulates an elastic force. The accumulated elastic force causes the spring 8 to push the second cam 7 clockwise so that the second cam 7 is rotated clockwise together.

The rotation of the second cam 7 causes the gear plate 2 to be rotated by generating a rotation rate to the flange 1 by the number of teeth between the internal gear 1a and the external gear 2a. As the rotation of the flange 1 causes the seatback to be rotated, the angle adjustment in the front and rear direction may be performed.

FIGS. 3 and 4 are an assembled-state perspective view and an enlarged view of the reclining device for a vehicle seat according to the related art.

Referring to FIGS. 3 and 4, according to the reclining device for a vehicle seat of the related art, the flange 1 is coupled to a seatback bracket (not shown), and the seatback bracket (not shown) is coupled to a seatback frame (not shown). The gear plate 2 is coupled to a seat cushion bracket (not shown) via a lower bracket A, and the seat cushion bracket (not shown) is coupled to a seat cushion frame (not shown). Thus, relative rotation between the flange 1 and the gear plate 2 causes an angle between the seatback frame (not shown) and the seat cushion frame (not shown) to be variable.

In particular, the gear plate 2 is welded in a state where the plate protrusion 2b is inserted in the lower bracket A to be integrally coupled to the lower bracket A. That is, the gear plate 2 is welded along a contact line in a state where an outer circumferential surface of the plate protrusion 2b is in contact with an inner circumferential surface of a coupling hole formed at the lower bracket A.

However, as shown in FIG. 4, as a reason of the relative rotation of the plate protrusion 2b in the coupling hole of the lower bracket A, there may be a problem that a welding line is partially spaced apart from the contact line between the outer circumferential surface of the plate protrusion 2b and the inner circumferential surface of the coupling hole. That is, when an actual welding line is formed outside a normal welding line formed along the contact line as shown in the drawing, since coupling force between the plate protrusion 2b and the lower bracket A does not sufficiently hold a load, the angle between the seatback frame (not shown) and the seat cushion frame (not shown) is not locked, which may cause passenger injury.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose a reclining device for a vehicle seat, wherein coupling force between a gear plate and a lower bracket is improved.

In order to achieve the above object, according to one aspect of the present invention, there is provided a reclining device for a vehicle seat. The reclining device includes: a flange having inner teeth at an inner circumferential surface thereof; a gear plate having an outer tooth part and a coupling part, the outer tooth part provided with outer teeth formed along a circumference thereof and engaged with a part of the inner teeth of the flange in an eccentric state with the flange, and the coupling part extending upward from the outer tooth part and having a locking step at an outer circumferential surface thereof; an input device provided inside a through hole of the gear plate, and coupled to a shaft to allow the flange and the gear plate to be eccentric with each other and to perform relative rotation when the shaft is rotated; and a bracket having an insertion hole in which the coupling part is inserted, wherein a locking protrusion that is locked by the locking step of the coupling part is formed at an inner circumferential surface of the insertion hole to prevent the relative rotation with the gear plate.

A plurality of locking steps and a plurality of locking protrusions may be provided, and the locking steps and the locking protrusions may be respectively formed by being spaced apart at regular intervals along the outer circumferential surface of the coupling part and the inner circumferential surface of the insertion hole.

The plurality of locking steps and the plurality of locking protrusions may be provided, and the locking steps and the locking protrusions may have trapezoidal cross-sections, and may be in surface contact with each other at side surfaces thereof.

The plurality of locking steps may form outer locking teeth at the outer circumferential surface of the coupling part and the plurality of locking protrusions may form inner locking teeth at the inner circumferential surface of the insertion hole, and as the outer locking teeth and the inner locking teeth are engaged with each other, the gear plate and the bracket may be coupled to each other.

Further, the reclining device may include: a retainer having a through hole at a center portion thereof, and positioned at an upper portion of the flange to cover the inner teeth of the flange and a part of the outer tooth part of the gear plate, wherein the coupling part of the gear plate may pass through the through hole of the retainer and extend upwards.

The coupling part of the gear plate may be welded in a state of passing through the insertion hole of the bracket.

The coupling part of the gear plate may be butt-welded to the bracket in a state where a side surface of the locking step of the coupling part and a side surface of the locking protrusion of the insertion hole are in contact with each other.

According to the reclining device for a vehicle seat of the present invention, even when the gear plate and the bracket are integrally coupled to each other, relative rotation between the gear plate and the bracket can be prevented. Accordingly, coupling force between the gear plate and the bracket is improved so that unintentional change of angle between the seatback and the seat cushion can be prevented.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
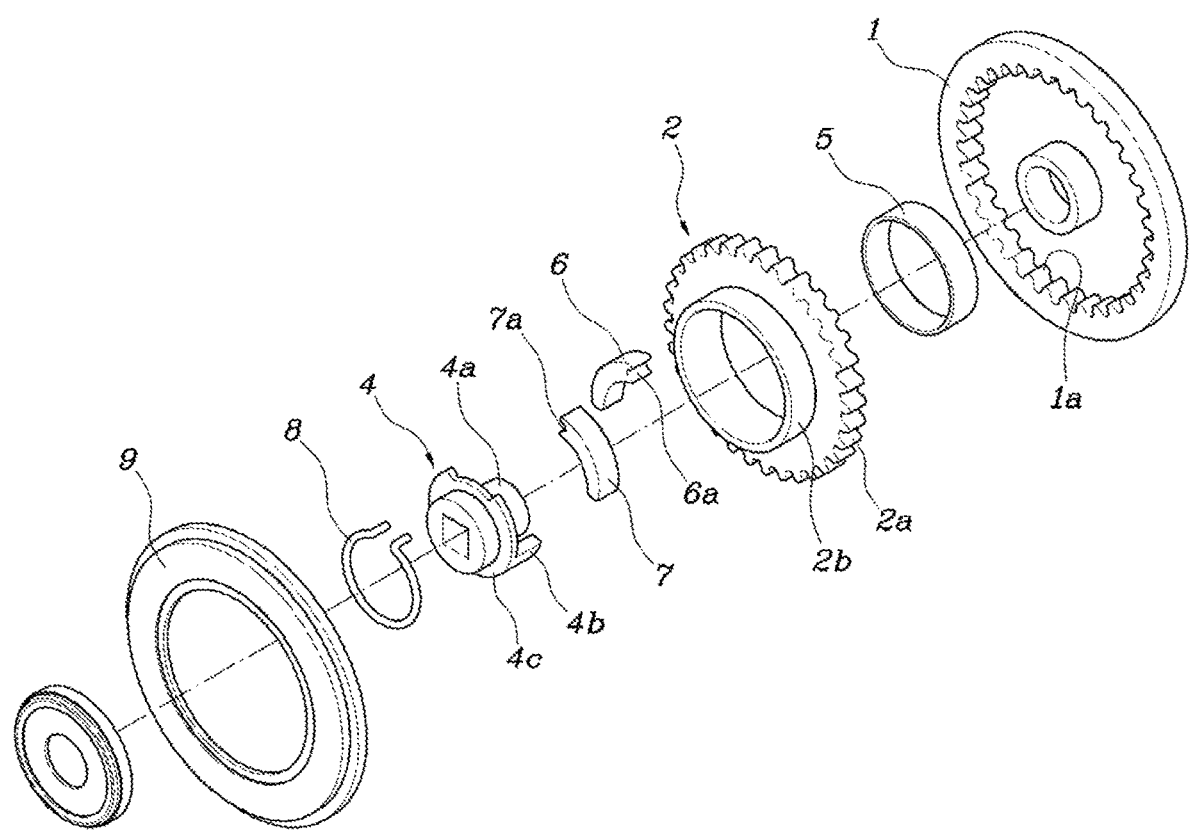
FIGS. 1 and 2 are an exploded perspective view and an assembled-state top view of a reclining device, respectively, for a vehicle seat according to the related art.
Figure 2:
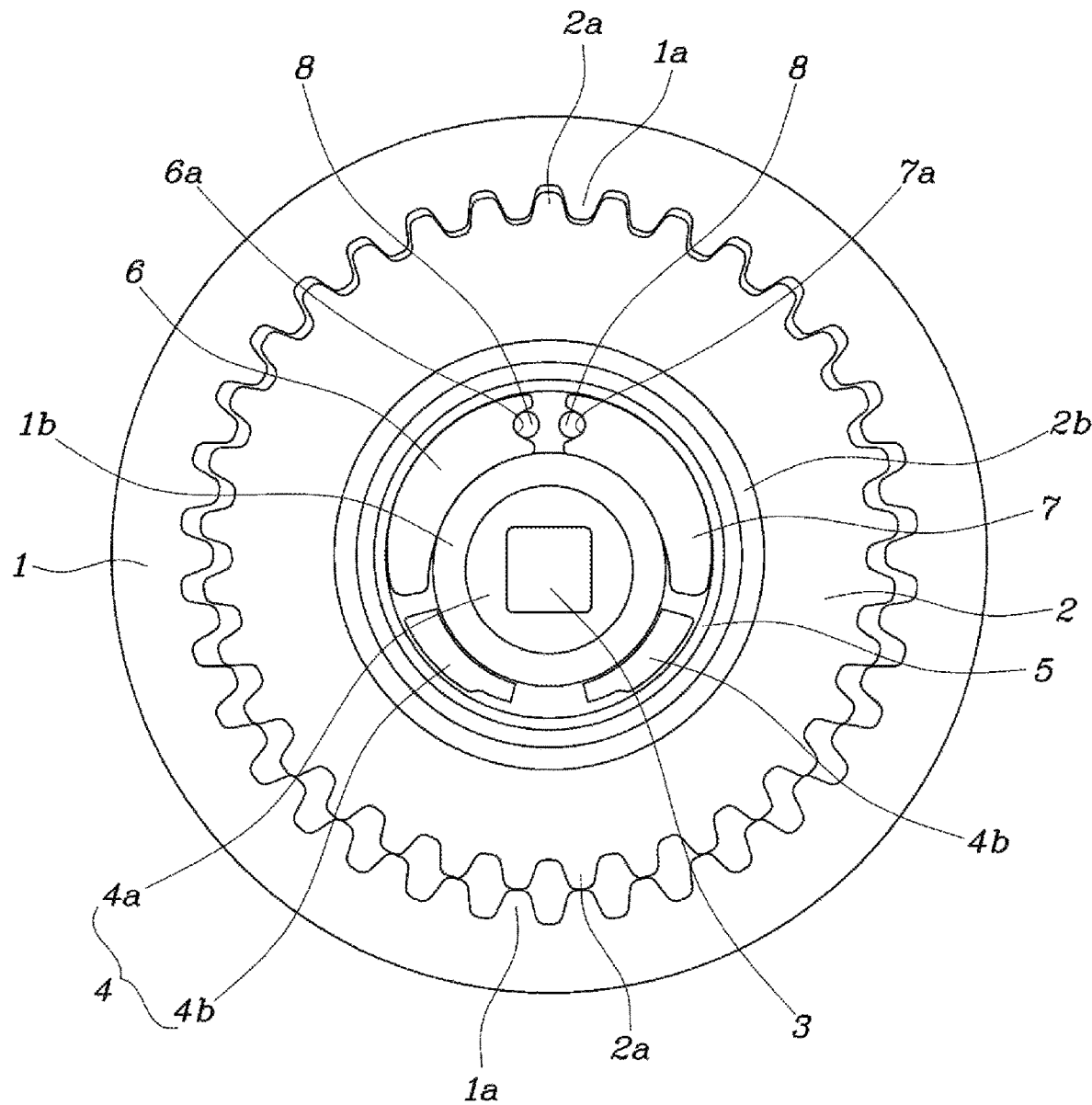
Figure 3:
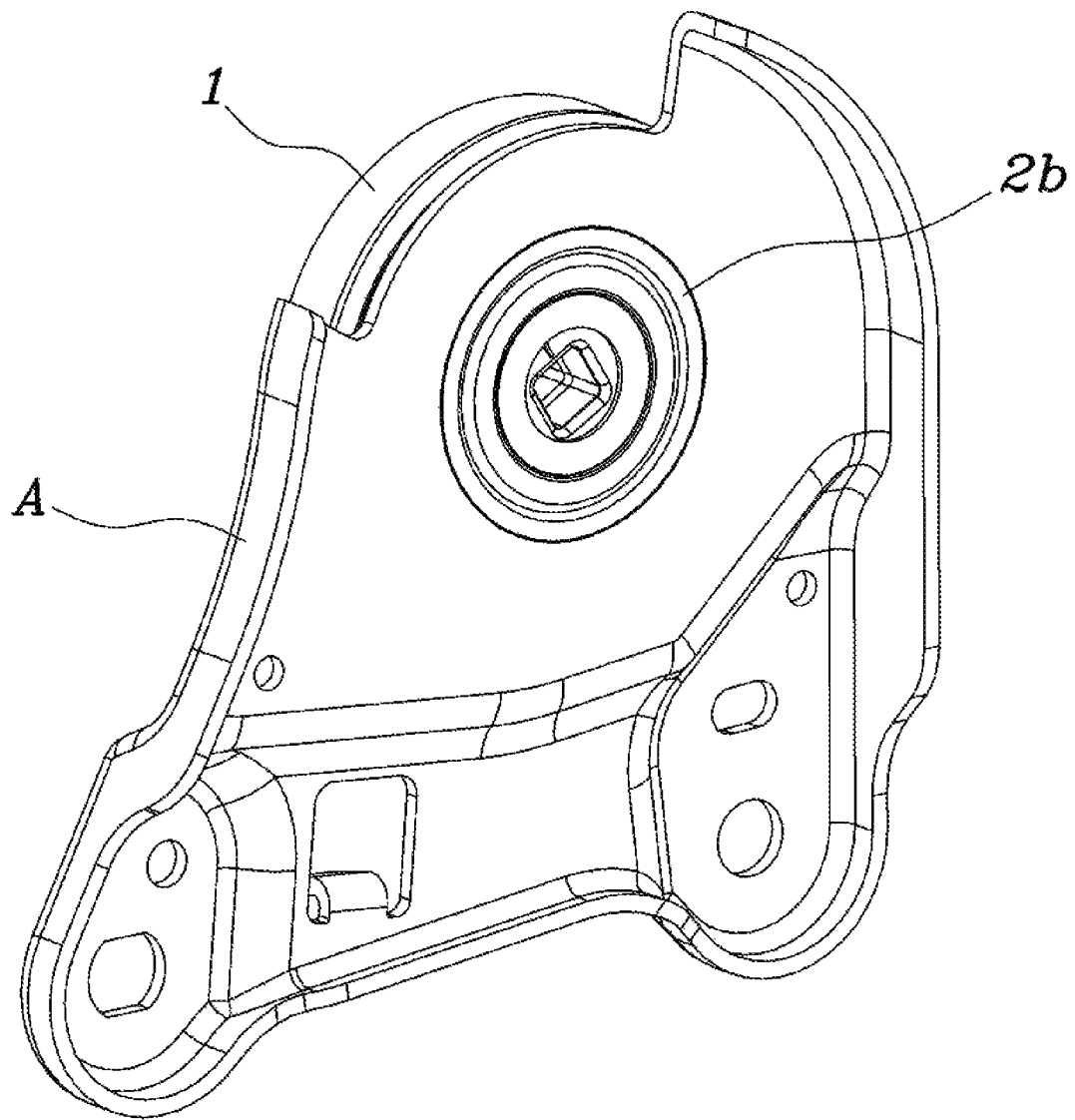
FIGS. 3 and 4 are an assembled-state perspective view and an enlarged view of the reclining device, respectively, for a vehicle seat according to the related art.
Figure 4:
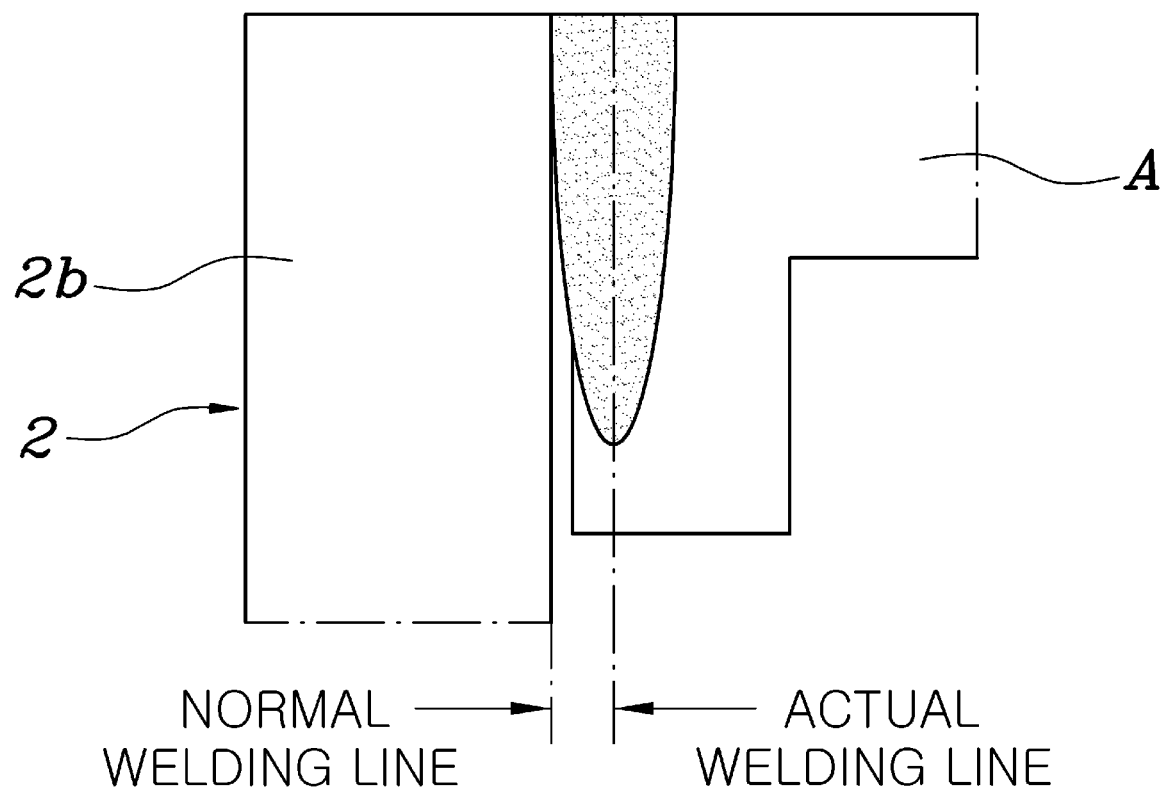

Specific structural and functional descriptions of embodiments of the present invention disclosed herein are only for illustrative purposes of the embodiment of the present invention. The present invention may be embodied in many different forms without departing from the spirit and significant characteristics of the present invention. Therefore, the embodiments of the present invention are disclosed only for illustrative purposes and should not be construed as limiting the present invention.

Reference will now be made in detail to the embodiments of the present invention, specific examples of which are illustrated in the accompanying drawings and described below, since the embodiment of the present invention can be variously modified in many different forms. While the present invention will be described in conjunction with an exemplary embodiment thereof, it is to be understood that the present description is not intended to limit the present invention to the exemplary embodiment. On the contrary, the present invention is intended to cover not only the exemplary embodiment, but also various alternatives, modifications, equivalents and other embodiments that may be included within the spirit and scope of the present invention as defined by the appended claims.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to" should be construed in the same way.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinbelow, an exemplary embodiment of the present invention will be described in detail with reference to the accompanying drawings. Throughout the drawings, the same reference numerals will refer to the same or like parts.

Figure 5:
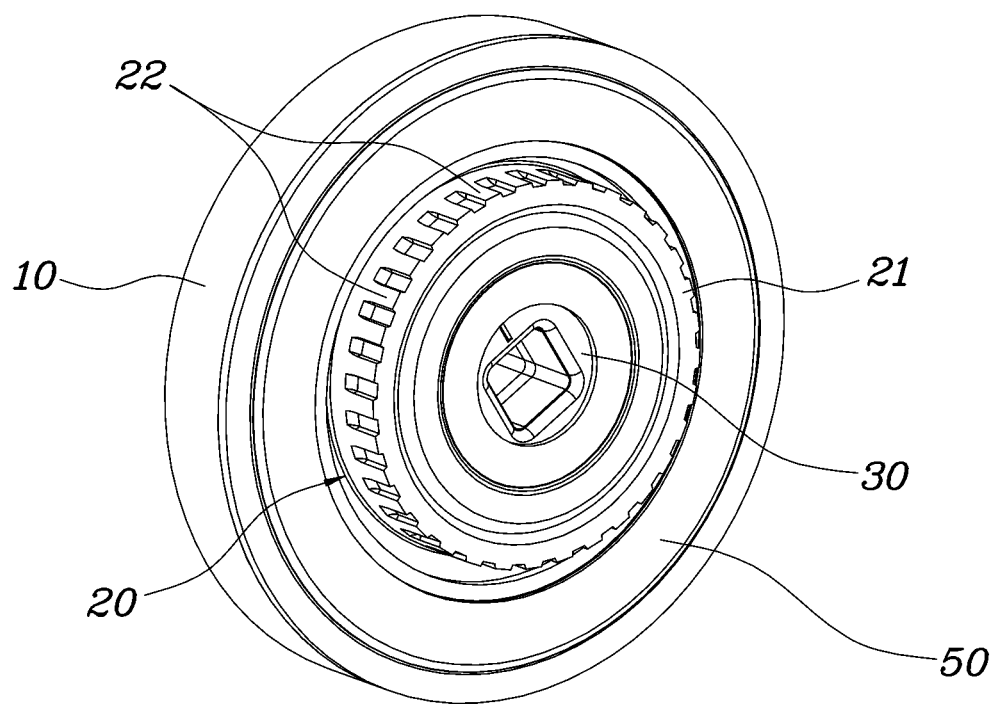
FIG. 5 is a view of a reclining device for a vehicle seat according to an embodiment of the present invention, the reclining device being in a pre-assembly state.
Figure 6:
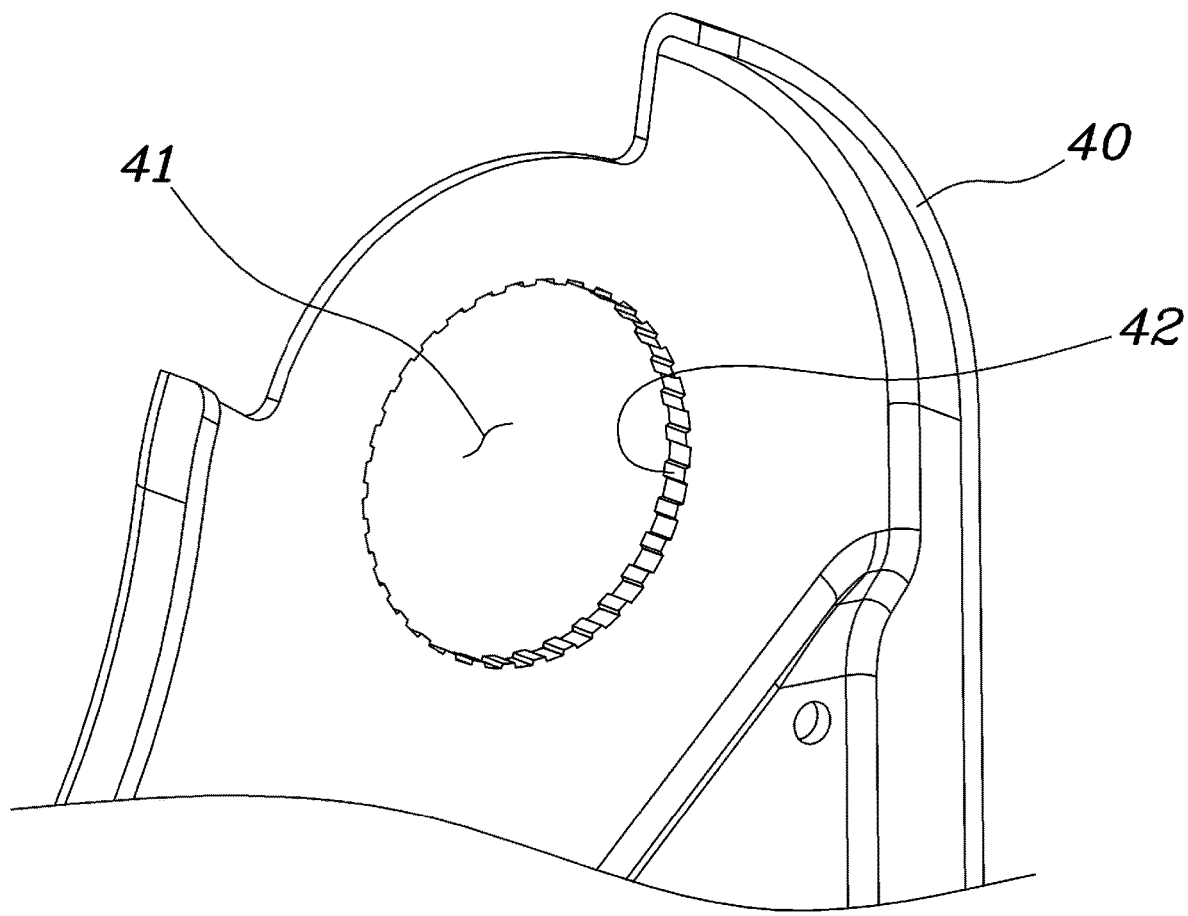
FIG. 6 is a view showing a lower bracket according to the embodiment of the present invention.

FIG. 5 is a view of a reclining device for a vehicle seat according to an embodiment of the present invention, the reclining device being in a pre-assembly state; FIG. 6 is a view showing a lower bracket 40 according to the embodiment of the present invention; and FIG. 7 is a view showing an assembled-state of the reclining device for the vehicle seat according to the embodiment of the present invention.

Figure 7:
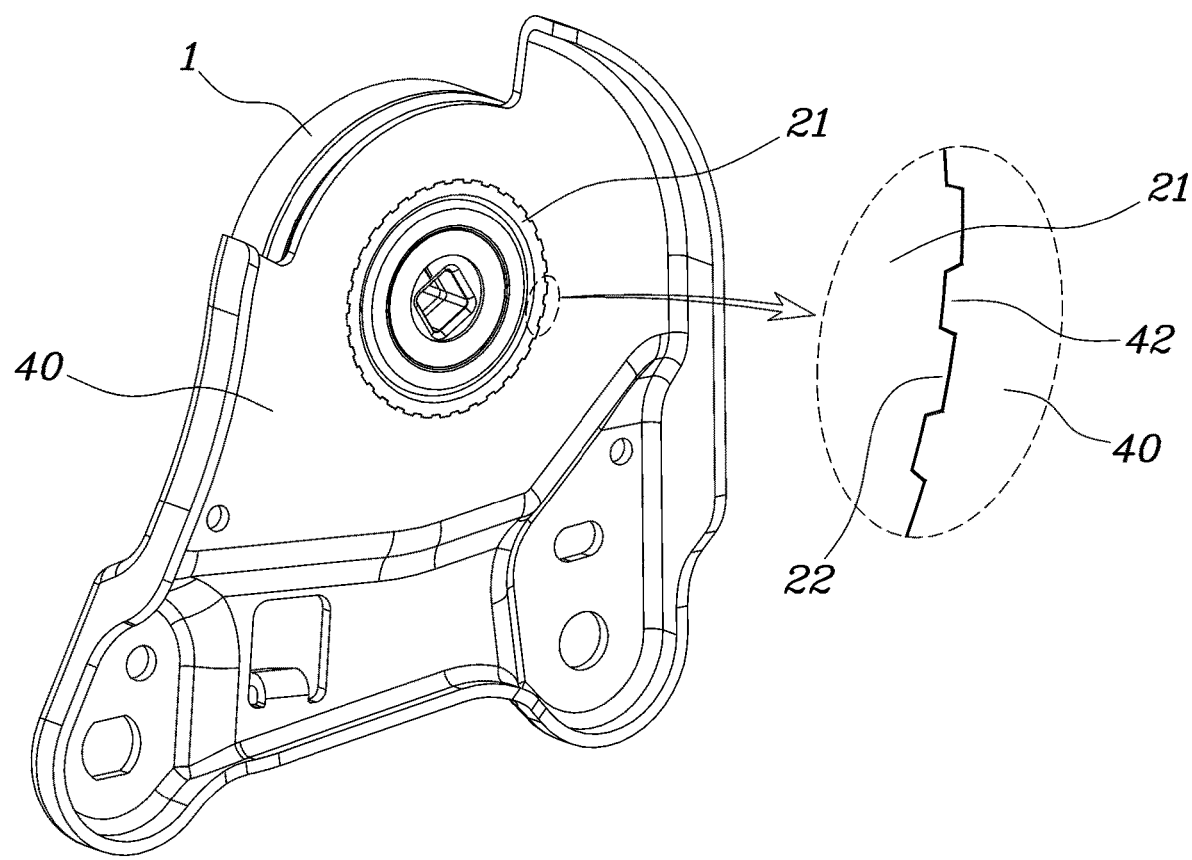
FIG. 7 is a view showing an assembled-state of the reclining device for the vehicle seat according to the embodiment of the present invention.

Referring to FIGS. 5 to 7, the reclining device for a vehicle seat according to the embodiment of the present invention includes: a flange 10 having an inner teeth at an inner circumferential surface thereof; a gear plate 20 having an outer tooth part (not shown) and a coupling part 21, the outer tooth part (not shown) provided with outer teeth formed along a circumference of the outer tooth part and engaged with a part of the inner teeth of the flange 10 in an eccentric state with the flange 10, and the coupling part 21 extending upward from the outer tooth part (not shown) and having a plurality of locking steps 22 at an outer circumferential surface of the coupling part 21; an input device 30 provided inside a through hole of the gear plate 20, and coupled to a shaft to allow the flange 10 and the gear plate 20 to be eccentric with each other and to perform relative rotation when the shaft is rotated; and a bracket 40 having an insertion hole 41 in which the coupling part 21 is inserted, wherein a locking protrusion 42 at which each of the locking steps 22 of the coupling part 21 is locked is formed at an inner circumferential surface of the insertion hole 41 to prevent the relative rotation with the gear plate 20.

The flange 10 has the inner teeth at the inner circumferential surface thereof and a cylindrical-shaped flange protrusion at the center thereof The gear plate 20 has an outer diameter smaller than an inner diameter of the flange 10 and the through hole at the center thereof The gear plate 20 is coupled to an upper portion of the flange 10 so that the flange protrusion is inserted into the through hole of gear plate 20.

In particular, the gear plate 20 includes the outer tooth part (not shown) and the coupling part 21. The outer tooth part (not shown) has the outer teeth formed along the circumference thereof and can be engaged with the part of the inner teeth of the flange 10 in the eccentric state with the flange 10. The coupling part 21 may extend upward in a state of sharing the through hole with the outer tooth part (not shown). The coupling part 21 is coupled to the bracket 40 by being inserted into the insertion hole 41 of the bracket 40 to be described below, and the gear plate 20 and the bracket 40 are rotated together.

The input device 30 may be inserted into the through hole of the gear plate 20 and rotated by the rotation of the shaft. The input device 30 may be eccentric with the gear plate 20, and be positioned concentrically with the flange 10. When the input device 30 is rotated by the shaft, the relative rotation between the gear plate 20 and the flange 10 may occur.

The bracket 40 may be a seatback bracket coupled to the flange 10, a seat cushion bracket to which the gear plate 20 is coupled, or a lower bracket coupled to the seat cushion bracket. The bracket 40 has the insertion hole 41 passing through the bracket 40, through which the coupling part 21 of the gear plate 20 is inserted. That is, the coupling part 21 is inserted into the insertion hole 41 of the bracket 40, and the outer circumferential surface of the coupling part 21 may be adjacent to or be brought into contact with the inner circumferential surface of the insertion hole 41.

The locking steps 22 may be disposed at the outer circumferential surface of the coupling part 21, the locking protrusions 42 at which the locking steps 22 of the coupling part 21 are locked may be disposed at the inner circumferential surface of the insertion hole 41. The locking steps 22 and the locking protrusions 42 are respectively formed in a plurality of locking grooves that are recessed outwards or inwards along the smooth circumferences, thereby forming relatively protruding shapes.

Accordingly, the relative rotation between the gear plate 20 and the bracket 40 may be prevented. That is, even when the gear plate 20 and the bracket 40 are not integrally coupled to each other, the relative rotation may be prevented and coupling force between the gear plate 20 and the bracket 40 may be improved, so that an unintentional change of angle between the seatback and the seat cushion may be prevented.

The plurality of locking steps 22 and the plurality of locking protrusions 42 may be spaced apart from each other at regular intervals along the outer circumferential surface of the coupling part 21 and the inner circumferential surface of the insertion hole 41, respectively. That is, the locking steps 22 may be formed to be spaced apart from each other along the outer circumferential surface of the coupling part 21, and the locking protrusions 42 may also be formed to be spaced apart from each other along the inner circumferential surface of the insertion hole 41. Accordingly, when the locking steps 22 and the locking protrusions 42 are simultaneously locked to each other, strong coupling force may be applied to the gear plate 20 and the bracket 40 without damaging the locking steps 22 and the locking protrusions 42 even under load.

As an exemplary embodiment, the locking step 22 and the locking protrusion 42 have trapezoidal cross-sections, and are in surface contact with each other at side surfaces thereof That is, a groove having a trapezoidal shape in which a width of a cross section thereof is widen toward the outside is formed on the coupling part 21, so that the locking step 22 may have a trapezoidal shape in which a width of a cross section thereof is narrowed toward the outside. The locking protrusion 42 of the insertion hole 41 may be formed in a trapezoidal shape in which a width thereof is narrowed toward the inside of the insertion hole 41. The width of the groove that is recessed inwards so as to form the locking step 22 of the coupling part 21 may be formed larger than the width of the locking protrusion 42, so that the locking protrusion 42 is easily inserted into the groove.

Specifically, the side surfaces of the locking step 22 and the locking protrusion 42 may be formed in parallel, so that the side surfaces of the locking step 22 and the locking protrusion 42 may be in surface contact with each other when the coupling part 21 is inserted into the insertion hole 41. Thus, the insertion may be easy so that the locking steps 22 and the locking protrusion 42 are fitted to each other, and the strong coupling force may be secured by the surface contact between the locking steps 22 and the locking protrusion 42.

As another embodiment, the locking steps 22 may be disposed at the outer circumferential surface of the coupling part 21 to form outer locking teeth, and the locking protrusion 42 may be disposed at the inner circumferential surface of the insertion hole 41 to form inner locking teeth. That is, the outer locking teeth of the gear plate 20 and the inner locking teeth of the bracket 40 may perform gear-engagement so that the locking steps 22 and the locking protrusions 42 are alternately engaged with each other.

The outer locking teeth of the coupling part 21 and the inner locking teeth of the insertion hole 41 may respectively have protrusions (gear teeth) at the same intervals as each other to be engaged in a gearing manner with each other, and may be formed in a spur gear or a helical gear. A gear is generally used for transmitting power, but in the present invention, the gear functions to couple the coupling part 21 and the insertion hole 41 together to prevent relative rotation of the coupling part 21 inside the insertion hole 41.

Further, the reclining device of the present invention includes a retainer 50 having a through hole at the center thereof The retainer 50 is positioned at the upper portion of the flange 10 to cover the inner teeth of the flange 10 and a part of the outer tooth part (not shown) of the gear plate 20. The coupling part 21 of the gear plate 20 may passes through the through hole of the retainer 50 and extend upwards.

The retainer 50 is coupled to the upper portion of the flange 10, and may cover the inner teeth of the flange 10 and the outer teeth formed at the outer tooth part (not shown) of the gear plate 20. Thus, a coupling portion between the flange 10 and the gear plate 20 is covered, and entering of foreign material from the outside may be prevented. The retainer 50 has the through hole at the center, and the coupling part 21 passes through the through hole of the retainer 50 and then extends upwards, and may be inserted into the insertion hole 41 of the bracket 40 at an upper portion of the retainer 50.

In addition, the coupling part 21 of the gear plate 20 may be welded in a state of passing through the insertion hole 41 of the bracket 40. The gear plate 20 is prevented from performing relative rotation by the locking engagement with the bracket 40, but may be welded to secure strong coupling force. Laser welding may be used therein.

The coupling part 21 may be butt-welded with the bracket 40 in a state where the side surface of the locking step 22 of the coupling part 21 and the side surface of the locking protrusion 42 of the insertion hole 41 face each other. That is, although the coupling part 21 is conventionally welded along a smooth circular welding line, laser welding may be performed along a contact line where the side surfaces of the locking step 22 and the locking protrusion 42 face each other by formation of the locking step 22 and the locking protrusion 42.

Accordingly, coupling force between the gear plate 20 and the bracket 40 may be higher than the conventional welding. Furthermore, it is possible to prevent separating of the coupling part 21 of the gear plate 20 from the insertion hole 41 of the bracket 40 as well as the relative rotation between the gear plate 20 and the bracket 40.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A reclining device for a vehicle seat, the reclining device comprising:
    a flange having inner teeth disposed at an inner circumferential surface thereof;
    a gear plate having an outer tooth part and a coupling part, the outer tooth part including outer teeth disposed along a circumference thereof and engaged with a part of the inner teeth of the flange in an eccentric state with the flange, and the coupling part extending upward from the outer tooth part and having at least one locking step disposed at an outer circumferential surface thereof;
    an input device disposed inside a through hole of the gear plate, and coupled to a shaft to allow the flange and the gear plate to be eccentric with each other and to perform relative rotation when the shaft is rotated; and
    a bracket having an insertion hole in which the coupling part is inserted, the insertion hole including at least one locking protrusion disposed at an inner circumferential surface thereof, wherein the at least one locking protrusion is locked by the at least one locking step of the coupling part to prevent the relative rotation with the gear plate.

2. The reclining device of claim 1, wherein the at least one locking steps comprises a plurality of locking steps and the at least one locking protrusion comprises a plurality of locking protrusions, and the plurality of locking steps and the plurality of locking protrusions are respectively spaced apart at regular intervals along the outer circumferential surface of the coupling part and the inner circumferential surface of the insertion hole.

3. The reclining device of claim 1, wherein the at least one locking steps comprises a plurality of locking steps and the at least one locking protrusion comprises a plurality of locking protrusions, and the plurality of locking steps and the plurality of locking protrusions have trapezoidal cross-sections, respectively, and are in surface contact with each other at side surfaces thereof.

4. The reclining device of claim 1, wherein the at least one locking steps comprises a plurality of locking steps and the at least one locking protrusion comprises a plurality of locking protrusions, and
    wherein the plurality of locking steps include outer locking teeth at the outer circumferential surface of the coupling part and the plurality of locking protrusions include inner locking teeth at the inner circumferential surface of the insertion hole, and as the outer locking teeth and the inner locking teeth are engaged with each other, the gear plate and the bracket are coupled to each other.

5. The reclining device of claim 1, further comprising:
    a retainer having a through hole at a center portion thereof, and positioned at an upper portion of the flange to cover the inner teeth of the flange and a portion of the outer tooth part of the gear plate,
    wherein the coupling part of the gear plate passes through the through hole of the retainer and extends upwards.

6. The reclining device of claim 1, wherein the coupling part of the gear plate is welded in a state of passing through the insertion hole of the bracket.

7. The reclining device of claim 6, wherein the coupling part of the gear plate is butt-welded to the bracket in a state where a side surface of the at least one locking step of the coupling part and a side surface of the at least one locking protrusion of the insertion hole are in contact with each other.

\* \* \* \* \*